(12) United States Patent
Wagner

(10) Patent No.: US 6,837,607 B2
(45) Date of Patent: Jan. 4, 2005

(54) ILLUMINATABLE ORNAMENT

(76) Inventor: David M. Wagner, S78 W16638 Spinnaker Dr., Muskego, WI (US) 53150

( * ) Notice: Subject to any disclaimer, the term of this patent is extended or adjusted under 35 U.S.C. 154(b) by 33 days.

(21) Appl. No.: 10/366,852

(22) Filed: Feb. 14, 2003

(65) Prior Publication Data

US 2004/0160788 A1 Aug. 19, 2004

(51) Int. Cl.[7] .......................... A47G 35/00; A63J 17/00
(52) U.S. Cl. ....................... 362/565; 362/581; 362/806; 40/546
(58) Field of Search ................................ 362/565, 566, 362/581, 806, 812; 40/546, 572, 547, 556

(56) References Cited

U.S. PATENT DOCUMENTS

| | | | | |
|---|---|---|---|---|
| 1,615,449 A | * | 1/1927 | Fullerton | 40/546 |
| 3,858,924 A | * | 1/1975 | Bores | 293/117 |
| 4,872,093 A | * | 10/1989 | Shimizu | 362/26 |
| 6,192,824 B1 | * | 2/2001 | Chang | 116/173 |
| 6,286,970 B1 | * | 9/2001 | Egawa et al. | 362/31 |

* cited by examiner

Primary Examiner—Alan Cariaso
Assistant Examiner—Mark Tsidulko
(74) Attorney, Agent, or Firm—Andrus, Sceales, Starke & Sawall, LLP

(57) ABSTRACT

An illuminatable ornament comprises an elongated translucent member extending along a longitudinal axis and an illuminatable decorative display coupled to the translucent member. The member has a base that couples the member to a light source which directs light along the axis. The translucent member is formed of a plurality of surfaces that redirect light substantially transversely to the axis to illuminate the decorative display.

14 Claims, 5 Drawing Sheets

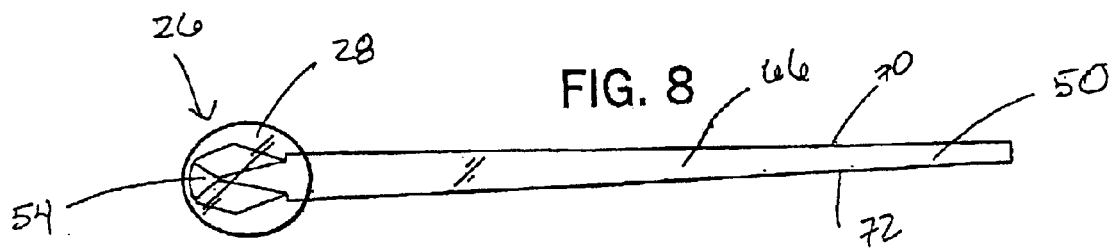
FIG. 8
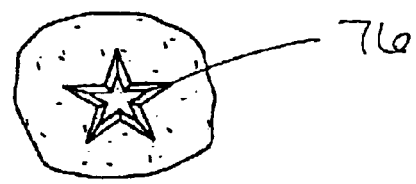
FIG. 9
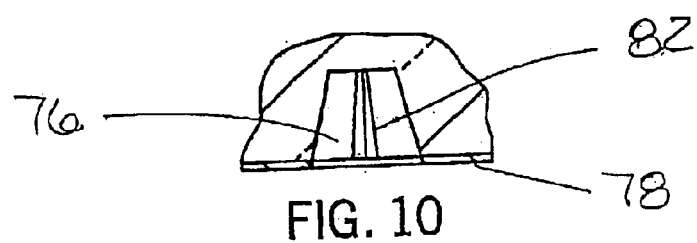
FIG. 10
FIG. 11
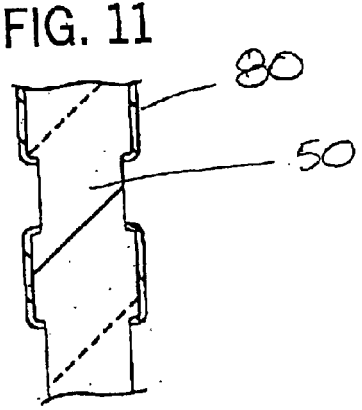

ILLUMINATABLE ORNAMENT

BACKGROUND OF THE INVENTION

The present invention relates to an illuminatable ornament for connection to a light source.

Illuminatable ornaments are used for a variety of purposes, such as for personal decorations or for business or political advertisements. Illuminatable ornaments can provide decoration for an automobile or boat, or decoration for a residential or commercial property. Illuminatable ornaments can serve as decorative hand-held devices for use at social or business events, sporting events, and the like. Illuminatable ornaments are also used to provide permanent decoration, or in the alternative, to provide seasonal decoration during the holidays or other selected times of the year.

Illuminatable ornaments are often coupled to a light source that is part of a permanent structure, such as a light post or light fixture. Alternatively, illuminatable ornaments may be coupled to a handheld device, such as a flashlight or the like. It is therefore desirable to provide an illuminatable ornament that is adequate for use in a variety of settings and with light sources of various sizes, shapes, and strengths. Preferably, illuminatable ornaments distribute light evenly throughout a decorative display. It is also desirable to provide illuminatable ornaments that are resistant to the deleterious effect of harsh weather and/or extended use and that are safe for use in a variety of indoor and outdoor settings.

SUMMARY OF THE INVENTION

In accordance with the present invention, an illuminatable ornament has an elongated translucent member coupled to a decorative display. The translucent member has a base adapted to couple the member to a light source that directs light in a longitudinal direction through the base and into the member. The translucent member is shaped or configured in such a way so as to redirect the light and promote even distribution of the light into the decorative display and to thoroughly illuminate the decorative display. The illuminatable ornament may be attached to and function with light sources of various shapes, sizes, and strengths and may be used in a variety of settings.

In a preferred embodiment, the illuminatable ornament provides decoration for a lighted bumper guide on a vehicle, such as a truck. The illuminatable ornament is releasably coupled to the lighted bumper guide for viewing enjoyment in places of diminished light, such as for example a dark highway or road. The member extends along a longitudinal axis and has a series of tapered surfaces to redirect and promote thorough distribution of light emitted by the bumper guide throughout the decorative display.

In one particularly preferred embodiment, the translucent member is coupled along one edge of the decorative display so that the decorative display extends or projects transversely from the translucent member. In order to redirect the light entering through the base the elongated translucent member has an upper end portion opposite the base having an angled upper planar surface. The upper planar surface is disposed in a plane passing through the longitudinal axis and forming an acute angle with respect to the axis. The upper planar surface redirects light to illuminate the display.

In addition, the member also has an exterior planar side opposite the interior side to aid in redirecting the light. The exterior planar side is disposed in a plane that tapers at an acute angle toward the display along the axis from the base to the upper end portion. The opposite edges of the exterior planar side also converge toward each other along the axis from the base to the upper end portion of the translucent member to further aid in redirecting light.

The member also has opposing front and rear sides, each having a beveled face and a convex face, respectively, for redirecting light. Each beveled face has inner and outer opposite longitudinal edges. The inner and outer opposite longitudinal edges of each beveled face diverge outwardly with respect to each other along the axis from the base to the upper portion. The front and rear beveled faces taper toward each other so that the respective outer longitudinal edges are closer to each other than the respective inner longitudinal edges. The beveled faces also taper such that the upper ends of the respective outer longitudinal edges are closer to each other than the lower ends of their outer longitudinal edges. In other words, the beveled faces taper towards each other both along the axis from the base to the upper portion and transverse to the axis from the display to the exterior side. The convex faces are positioned between the beveled faces and the interior side.

The decorative display may comprise a rectangular-shaped extension containing American flag indicia. However, the display may be formed of a variety of alternative shapes, sizes and designs, and may contain any desired indicia.

BRIEF DESCRIPTION OF THE DRAWINGS

FIG. 5 is a top view of the ornament shown in FIG. 3.

FIG. 6 is an end view of the ornament shown in FIG. 3.

FIG. 7 is an opposite end view of the ornament shown in FIG. 3.

FIG. 8 is a bottom view of the ornament shown in FIG. 3.

FIG. 9 is a view of a star-shaped indentation in the decorative display shown in section E—E in FIG. 3.

FIG. 10 is a sectional side view of the star-shaped indention shown in FIG. 9.

FIG. 11 is a sectional view of the decorative display as taken along section F—F in FIG. 3.

DETAILED DESCRIPTION OF THE PREFERRED EMBODIMENT

A preferred embodiment of the illuminatable ornament for connection to a light source according to the present invention will be described in detail below.

Figure 1:
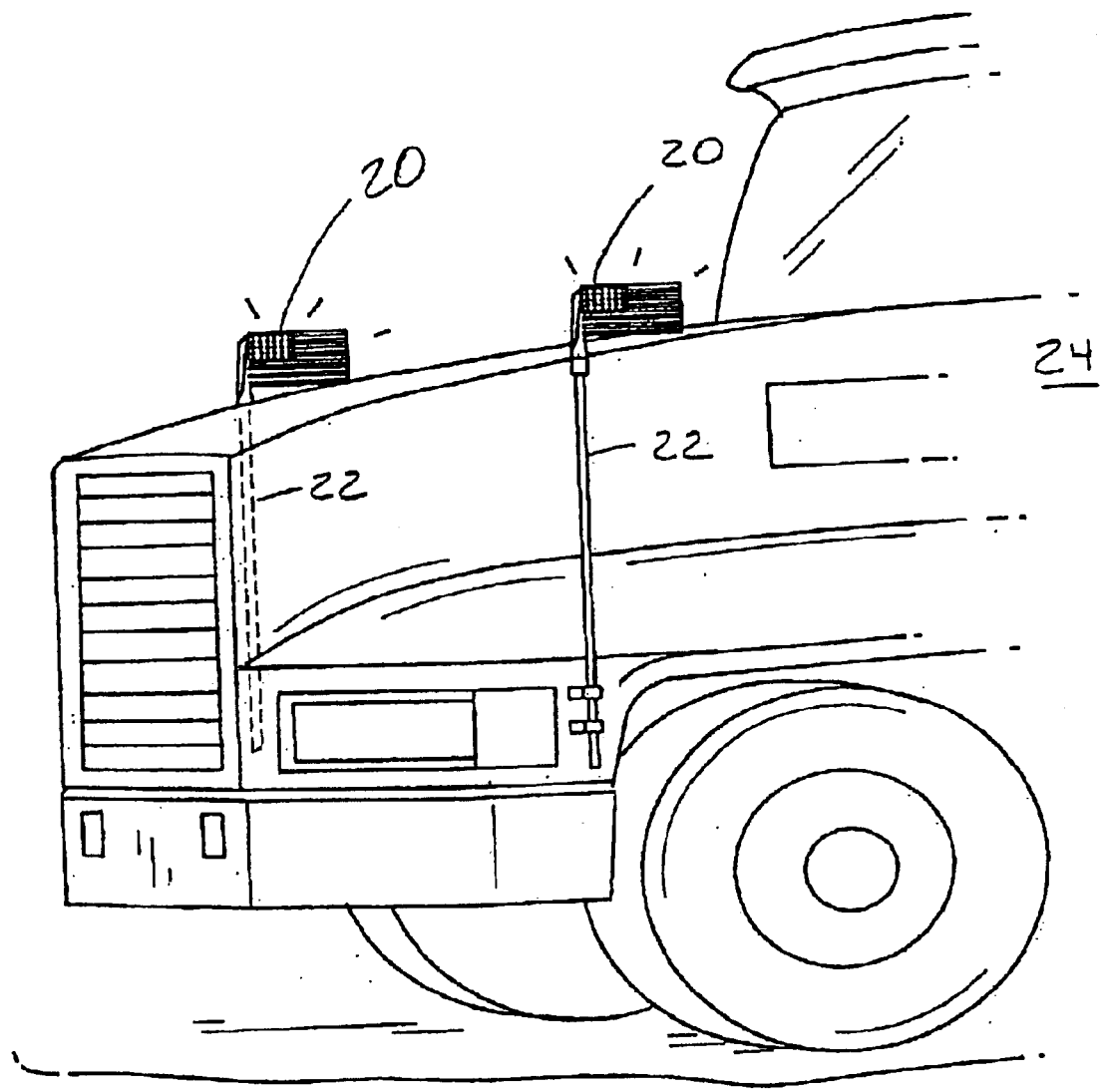
FIG. 1 is a perspective view showing a preferred embodiment of two illuminatable ornaments, each coupled to a truck bumper guide on the front of a truck.

In FIG. 1, two illuminatable ornaments 20 are coupled to respective lighted bumper guides 22 attached to the front end of a truck 24. Light emitted by the lighted bumper guides 22 is received by and illuminates the illuminatable ornaments 20, allowing the ornaments 20 to be clearly viewed in places of diminished light, such as for example, a dark highway or road.

Figure 2:
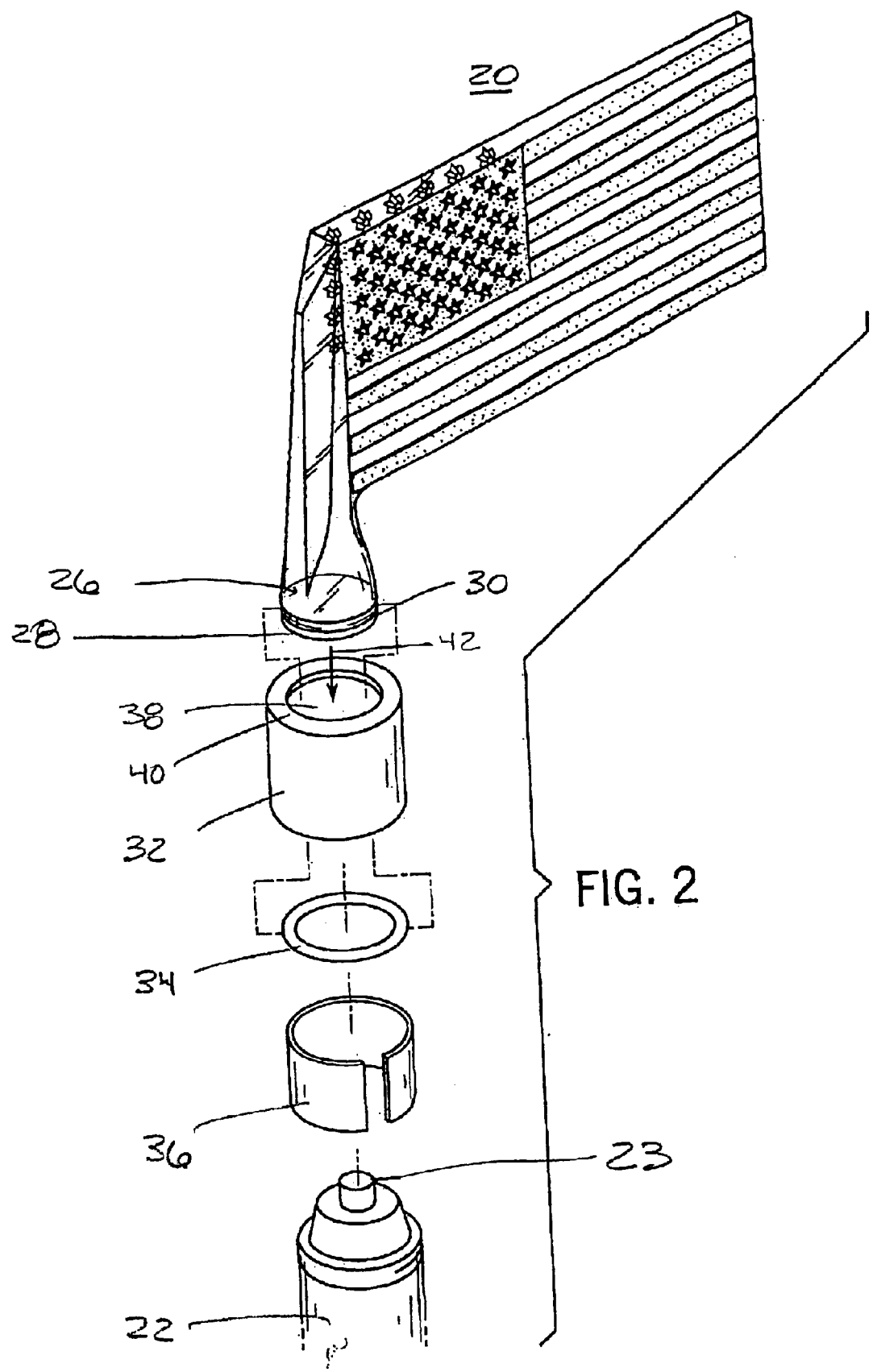
FIG. 2 is an exploded perspective view showing the ornament and a connector for connecting the ornament to the truck bumper guide.
Figure 3:
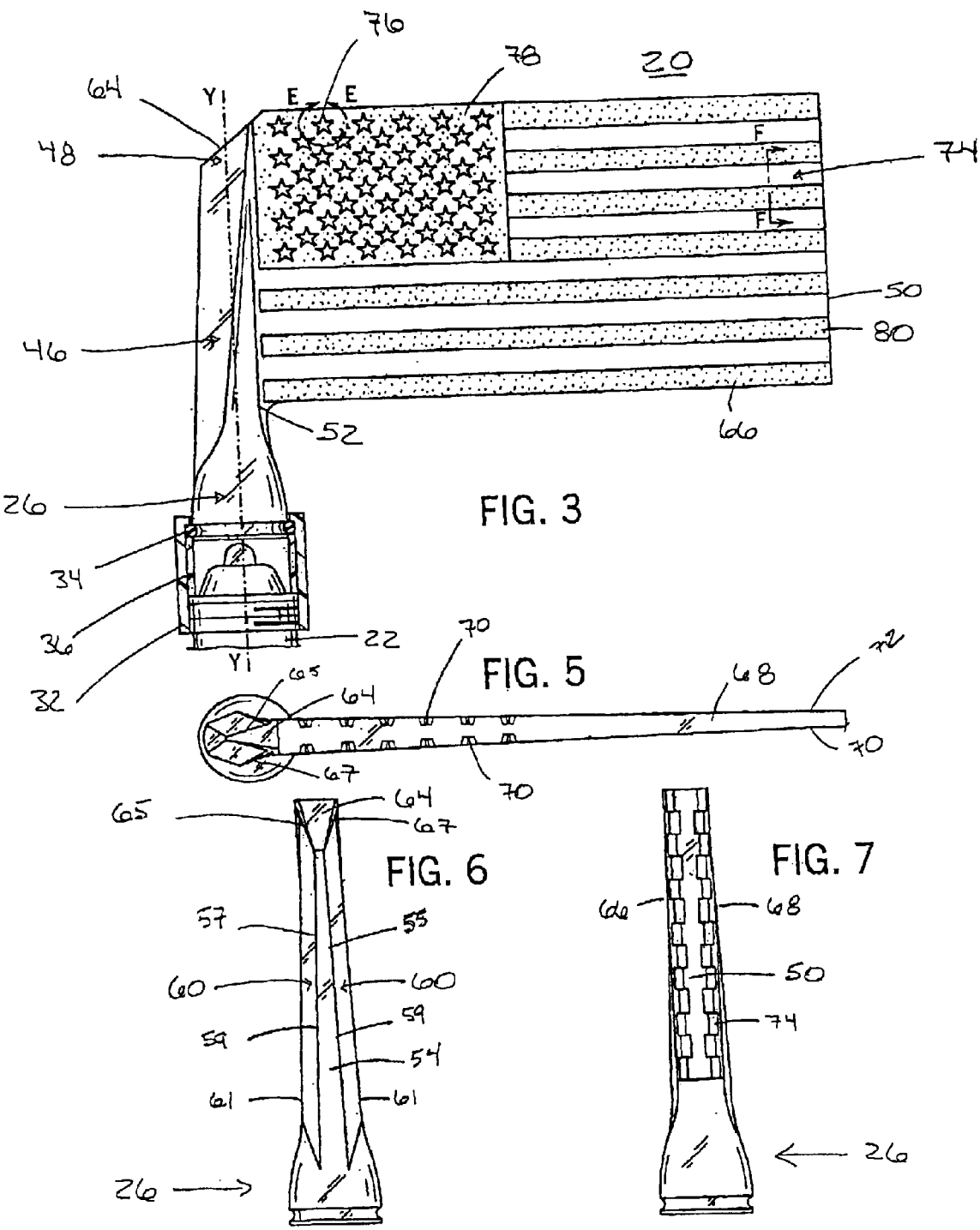
FIG. 3 is a side view of the ornament having a display in the shape of an American flag.

As shown in FIGS. 2, 3 and 8, the illuminatable ornament 20 has a base portion 26 forming a substantially conical section having a flat bottom 28 disposed transverse to axis Y—Y. The base portion 26 is disposed coincident with and in-line with light bulb 23 of bumper guide 22 and receives light emitted by bulb 23 of bumper guide 22. An annular groove 30 is formed around the base portion 26 adjacent flat bottom 28.

The various components for coupling the illuminatable ornament 20 to the lighted bumper guide 22 are also shown in FIG. 2 in exploded view. The illuminatable ornament 20 is connected to the bumper guide 22 by a connector comprising a cylindrical sleeve 32, a gasket or O-ring 34, and a cylindrical spacer 36. The base portion 26 has an outside diameter that is slightly less than the inside diameter of aperture 38 formed in lip 40 on the upper end of sleeve 32. To attach the ornament 20 to the bumper guide 22, the base portion 28 is inserted through the lip 40 in a direction indicated by arrow 42. The O-ring 34 is fit around the lower end of base 26 and received within groove 30 on the base portion 26. The spacer 36 fits within the sleeve 32 and is positioned between the O-ring 34 and the bumper guide 22. In this arrangement, the sleeve 32, containing the base portion 26 and the O-ring 34, is slid down over the spacer 36 in the direction of arrow 42 and threaded onto the bumper guide 22. The sleeve 32 secures the illuminatable ornament 20 and the spacer 36 to the top of the bumper guide 22, and lip 40 provides a seal with O-ring 34.

As shown in FIG. 3, the upper edge of spacer 36 fits snugly against O-ring 34 to form a second seal which further aids in preventing liquid, such as rainwater, or particulate matter from passing between the illuminatable ornament 20 and the bumper guide 22. While the connector embodiment shown is preferred for connecting the ornament 20 to a lighted bumper guide, it should be recognized that the ornament 20 may be coupled to various other light sources by means of a variety of connectors known in the art.

The illuminatable ornament 20 has an elongated translucent member 46 and an illuminatable decorative display 50. The member 46 extends along a longitudinal axis represented by the dashed line Y—Y (see FIG. 3) and has an upper end portion 48 opposite the base portion 26. The decorative display 50 is coupled to and extends transversely from the interior side 52 of the translucent member 46. When the ornament 20 is coupled to the lighted bumper guide 22, the member 46 illuminates the decorative display 50 by redirecting light originally emitted by the bumper guide 22 along axis Y—Y in a substantially transverse direction into display 50. In the embodiment shown, the decorative display 50 consists of a rectangular member having American flag indicia. However, as will be described below, the display 50 may comprise a variety of shapes, sizes and designs with any desired indicia thereon.

Figure 4:
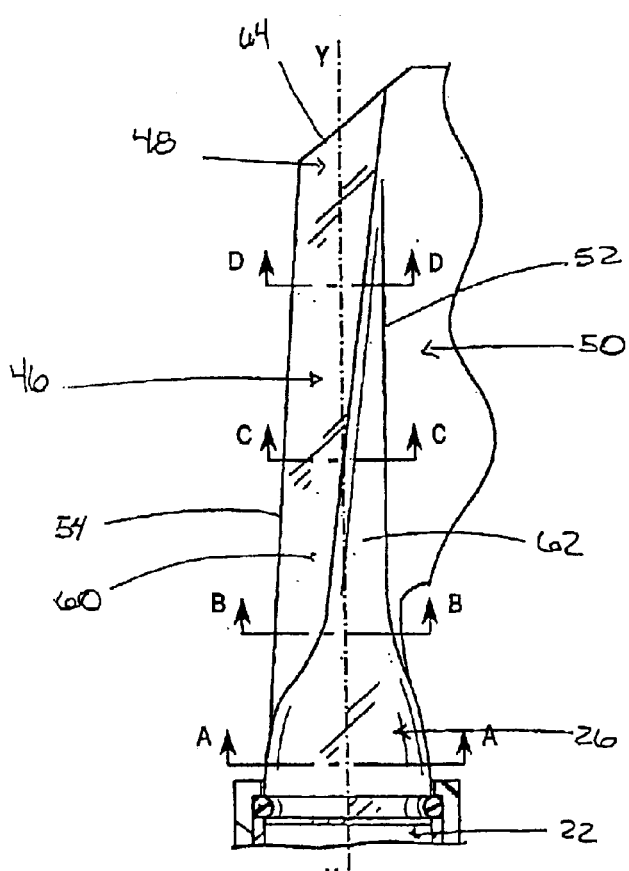
FIG. 4 is a side view of the elongated translucent member.
Figure 4D:
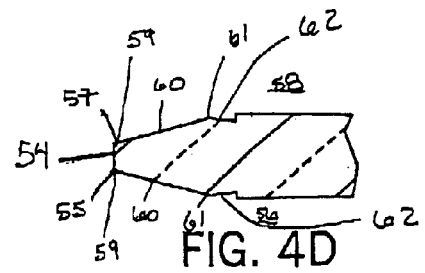
FIG. 4D is a sectional view of the member, as taken along line D—D as shown in FIG. 4.
Figure 4C:
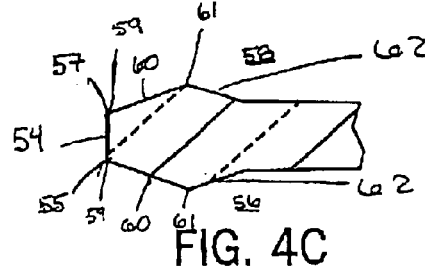
FIG. 4C is a sectional view of the member, as taken along line C—C shown in FIG. 4.
Figure 4B:
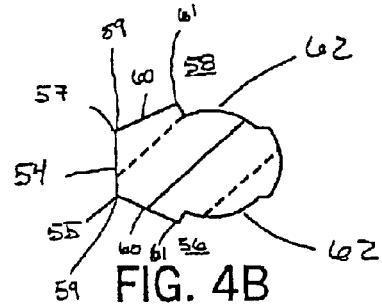
FIG. 4B is a sectional view of the member, as taken along line B—B shown in FIG. 4.
Figure 4A:
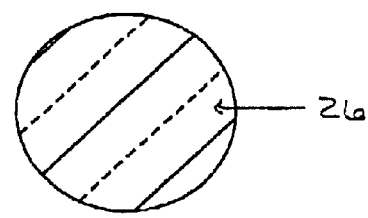
FIG. 4A is a sectional view of the member, as taken along line A—A shown in FIG. 4.

Referring now to FIGS. 4 and 4A–D, the elongated translucent member 46 will be more fully described. The member 46 has a series of tapered surfaces for redirecting light emitted by the lighted bumper guide 22 to illuminate the decorative display 50. FIGS. 4A-D represent sectional views of the member taken along respective lines A—A, B—B, C—C, and D—D, as shown in FIG. 4.

The member 46 has an interior side 52 adjacent the decorative display 50 and an exterior planar side 54 opposite the interior side 52. The exterior planar side 54 is disposed in a plane that tapers at an acute angle toward the display along the axis Y—Y from the base 26 to the upper end portion 48. Therefore, the transverse distance between the exterior planar side 54 and axis Y—Y decreases along the axis Y—Y from the base portion 26 to the upper end portion 48. Referring briefly to FIG. 6, the opposite edges 55, 57 of the exterior planar side 54 converge towards each other along the axis Y—Y from the base portion 26 to the upper end portion 48. Therefore, the surface area of the exterior planar side 54 decreases along the Y—Y axis from the base portion 26 to the upper end portion 48.

Referring back to FIGS. 4 and 4A-D, the member 46 also has opposing front and rear sides 56, 58. The opposing sides 56, 58 are preferably mirror images of each other and each consists of a beveled face 60 and a convex face 62. Each opposing beveled face 60 is adjacent the exterior side 54 and extends along the longitudinal axis Y—Y from the base portion 26 to the upper end portion 48. Each beveled face 60 has outer and inner longitudinal edges 59, 61 that diverge outward with respect to each other along the axis Y—Y from the base portion 26 to the upper portion 48. Therefore, the surface area of each planar face 60 becomes greater along the axis Y—Y from the base portion 26 to the upper end portion 48. The respective outer longitudinal edges 59 of each beveled face 60 are adjacent an respective edge 55, 57 of the exterior planar side 54.

The front and rear beveled faces 60 also taper with respect to the longitudinal axis Y—Y. The faces 60 converge towards each other so that the outer longitudinal edges 59 are closer to each other than the inner longitudinal edges 61. The beveled faces 60 also taper such that the outer longitudinal edges 59 near the upper end portion 48 are closer to each other than the outer longitudinal edges 59 near the base portion 26. In other words, the beveled faces 60 taper towards each both along the axis Y—Y from the base portion 26 to the upper portion 48 and transverse to the axis Y—Y from the display 50 to the exterior side 54.

Opposing convex faces 62 are positioned between the planar faces 60 and the interior side 52. The convex faces 62 extend along the longitudinal axis Y—Y from the base portion 26 to the upper end portion 48 and between the interior side 52 and the respective adjacent planar face 60.

Referring now to FIGS. 4, 5 and 6, the exterior planar side 54, interior side 52, and opposing sides 58, 56 extend from the base portion 26, along the axis Y—Y, to the upper planar surface 64. As shown in FIGS. 4 and 6, the upper planar surface 64 is disposed in a plane passing through the axis Y—Y that forms an acute angle with respect to the axis Y—Y. The acute angle formed by the upper planar surface 64 is typically between 37° and 57° and is preferably 47°. The upper planar surface 64 reflects light emitted from the lighted bumper guide 22 to illuminate the display 50. The upper planar surface has opposing edges 65, 67 that diverge away from each other from the exterior side 54 to the display 50. Therefore the surface area of the upper planar surface 64 increases as the transverse distance along the longitudinal axis Y—Y to the design 50 decreases.

Referring to FIGS. 3, 5, 7, and 8, the translucent decorative display 50 consists of a rectangular shaped member having upper and lower planar faces 66, 68 extending transverse to the axis Y—Y. Each face 66, 68 has front and rear longitudinal edges 70, 72 that converge inward along the display 50 transverse to the axis Y—Y. The display 50 also has a front 74 and rear (not shown) planar faces having American flag indicia. The indicia consists of a plurality of star-shaped indentations 76 within a single rectangular print 78 and a plurality of raised striped prints 80 extending transverse to the longitudinal axis Y—Y. As shown in FIGS. 9 and 10, each star-shaped indentation 76 comprises a plurality of angular grooves 82. When light is redirected by the elongated member 46 to the decorative display 50, the light is again redirected by the angular grooves 82 to clearly illuminate the star-shaped indentations 76 for viewing in places of diminished light.

As shown in FIGS. 3, 7 and 11, the plurality of raised striped prints 80 extend along both the front and rear planar faces of the display 50. As the elongated member 46 directs light to the decorative display 50, the raised striped prints 80 channel the light along the front 74 and back of the display, thoroughly illuminating the prints 80 for viewing in places of diminished light.

The illuminated translucent member 46 and the decorative display 50 may be comprised of any combination or variety of translucent materials suitable for transferring and redirecting light. A preferred material of construction is clear acrylic plastic.

Although the present embodiment depicts an ornament designed for coupling to a lighted bumper guide, it should be recognized that the present invention may be designed for use with a variety of light sources. As described above, lighted ornaments are useful for many purposes, such as for personal decorations or for business or political advertisements. The unique design of the ornament enables it to function with many alternative light sources, such as for example, light fixtures or hand held light sources such as flashlights.

In addition, although the present embodiment depicts a decorative display consisting of a rectangular member with American flag indicia, it should be recognized that the decorative display may comprise a wide variety of shapes and designs. For example, the decorative display may consist of a football helmet shaped extension with the design of a popular football team. Conversely, the decorative display may consist of designs for advertising slogans or political campaign slogans, or the like. It should therefore be recognized that the decorative display is not limited to a particular shape or design.

It will thus be seen that the objects set forth above, among those made apparent from the preceding description, are efficiently attained, and since certain changes may be made in the design and construction as set forth, without departing from the spirit and scope of the invention, it is intended that all matter contained in this description and shown in the drawings shall be interpreted as illustrative and not in a limiting sense.

It is also to be understood that the following claims are intended to cover all of the generic and specific features of the invention herein described and all statements of the scope of the invention, which as a matter of language, might be said to fall therebetween.

I claim:

1. An illuminatable ornament, said ornament comprising:
    an elongated translucent member extending along a longitudinal axis, said translucent member having a base and an opposite upper end portion, said base adapted to couple said member to a light source that directs light along said axis;
    an illuminatable decorative display coupled to and extending from said translucent member, wherein said translucent member redirects light to illuminate said decorative display;
    wherein said upper end portion comprises an upper surface, said upper surface disposed in a plane passing through said axis, said plane forming an acute angle with respect to said axis, and said upper surface redirecting light from said light source to illuminate said display;
    an interior side from which said decorate display extends; and
    an exterior planar side opposite said interior side, said exterior planar side disposed in a plane which tapers at an acute angle toward said display along said axis from said base to said upper end portion;
    wherein said upper surface comprises opposing edges, said edges diverging from each other from said exterior side to said display.

2. The illuminatable ornament of claim 1, further comprising a connector for releasably connecting said base to said light source.

3. The illuminatable ornament of claim 1, wherein said base comprises a conical section having a substantially flat bottom.

4. The illuminatable ornament of claim 1 wherein said translucent member is composed of clear acrylic plastic.

5. The illuminatable ornament of claim 1 wherein said light source is a truck bumper guide.

6. An illuminatable ornament, said ornament comprising:
    an elongated translucent member extending along a longitudinal axis, said translucent member having a base and an opposite upper end portion, said base adapted to couple said member to a light source that directs light along said axis;
    an illuminatable display coupled to and extending from said translucent member, wherein said translucent member redirects light to illuminate said decorative display;
    wherein said upper end portion comprises an upper surface, said upper surface disposed in a plane passing through said axis, said plane forming an acute angle with respect to said axis, and said upper surface redirecting light from said light source to illuminate said display;
    an interior side from which said decorative display extends; and
    an exterior planar side opposite said interior side, said exterior planar side disposed in a plane which tapers at an acute angle toward said display along said axis from said base to said upper end portion;
    wherein said member further comprises opposing front and rear sides, said front and rear sides each having a beveled face exterior side, said beveled faces tapering towards each other along said axis from said base to said upper portion and transverse from said axis to said exterior side.

7. The illuminatable ornament of claim 6, wherein said beveled faces each have inner and outer longitudinal edges, said inner and outer longitudinal edges diverging outward, away from each other along said axis from said base to said upper portion.

8. The illuminatable ornament of claim 6, wherein said opposing front and rear sides each further comprise a convex face between said beveled face and said interior side.

9. An illuminatable ornament, said ornament comprising:
    an elongated translucent member extending along a longitudinal axis, said translucent member having a base and an opposite upper end portion, said base adapted to couple said member to a light source that directs light along said axis; and an illuminatable decorative display coupled to and extending from said translucent member, wherein said translucent member redirects light to illuminate said decorative display;

wherein said display comprises a rectangular member having upper and lower faces, said upper and lower faces each having opposing edges that converge towards each other, away from said axis.

10. The illuminatable ornament of claim 9, wherein said display further comprises:

front and rear planar faces comprising American flag indicia, said indicia comprising a plurality of star-shaped indentations, said indentations comprising a plurality of grooves for redirecting light from said extension.

11. The illuminatable ornament of claim 10, wherein said indicia further comprises a plurality of channels extending transverse to said axis.

12. An illuminatable ornament, said ornament comprising:

an elongated translucent member extending along a longitudinal axis, said translucent member having a base and an opposite upper end portion, said base adapted to couple said member to a light source that directs light along said axis;

an illuminatable decorative display extending from said translucent member, wherein said translucent member redirects light along said axis to illuminate said decorate display;

means for connecting the illuminatable ornament to a light source;

an interior side from which said decorative display extends; and an exterior planar side opposite said interior side, said exterior planar side disposed in a plane which tapers at an acute angle toward said display along said axis from said base to said upper end portion;

wherein said upper surface comprises opposing edges, said edges diverging from each other from said exterior side to said display.

13. The illuminatable ornament of claim 12, wherein said upper end portion comprises an upper surface, said upper surface disposed in a plane passing through said axis, said plane forming an acute angle with respect to said axis and said upper surface redirecting light from said light source to illuminate said display.

14. An illuminatable ornament, said ornament comprising:

an elongated translucent member extending along a longitudinal axis, said translucent member having a base and an opposite upper end portion, said base adapted to couple said member to a light source that directs light along said axis;

an illuminatable decorative display extending from said translucent member, wherein said translucent member redirects light along said axis to illuminate said decorative display;

means for connecting the illuminatable ornament to a light source;

an interior side from which the decorative display extends; and an exterior planar side opposite said interior side, said exterior planar side disposed in a plane which tapers at an acute angle toward said display along said axis from said base to said upper end portion;

wherein said member further comprises opposing front and rear sides, said front and rear sides each having a beveled face exterior side, said beveled faces tapering towards each other along said axis from said base to said upper portion and transverse from said axis to said exterior side.

* * * * *